W. S. SHERMAN.
FEEDER FOR END MATCHERS.
APPLICATION FILED JUNE 3, 1916.
1,255,938.
Patented Feb. 12, 1918.
3 SHEETS—SHEET 3.
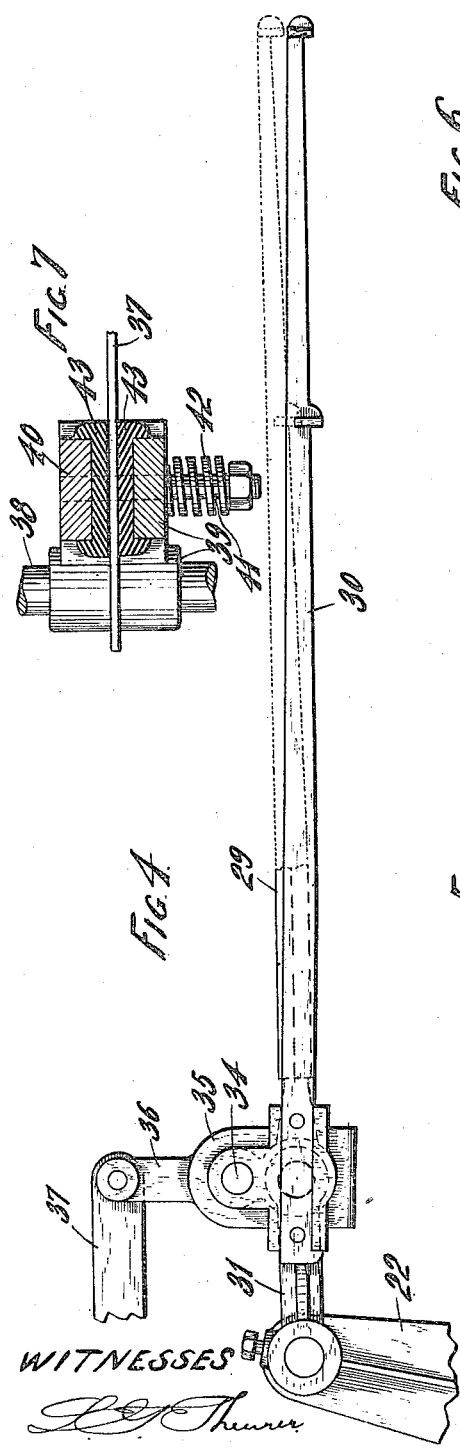
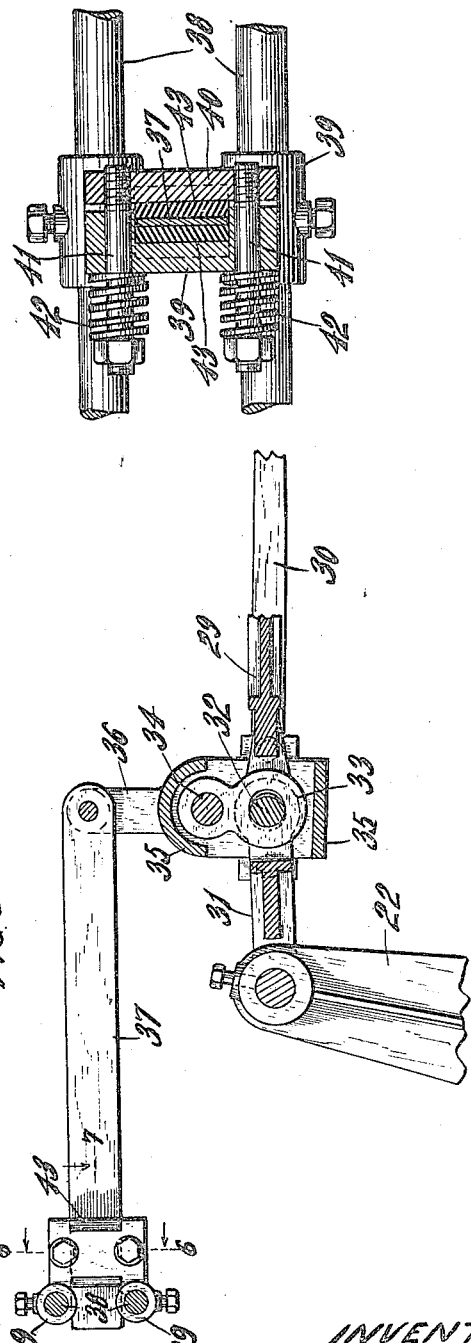
WITNESSES
INVENTOR
ATTORNEY

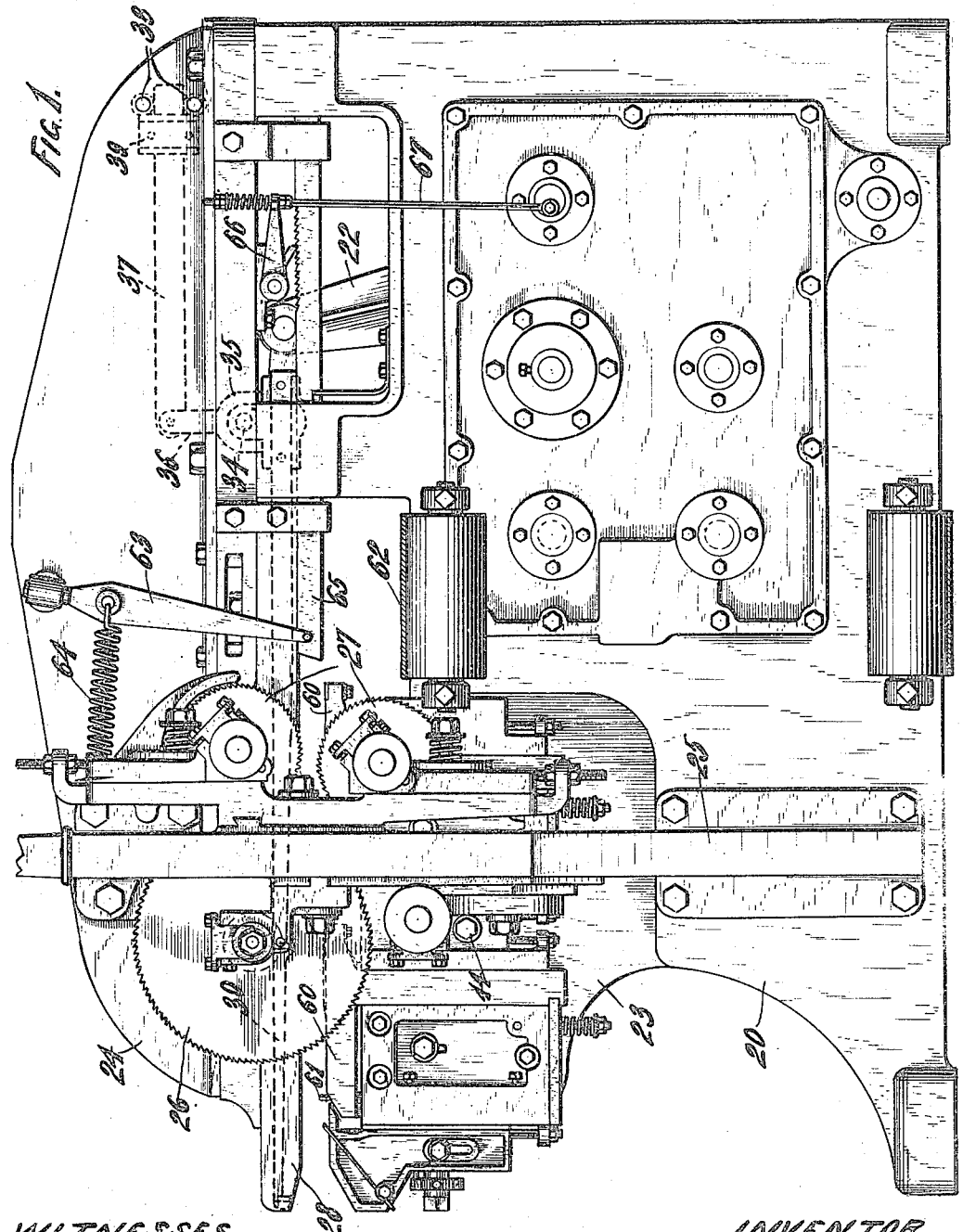

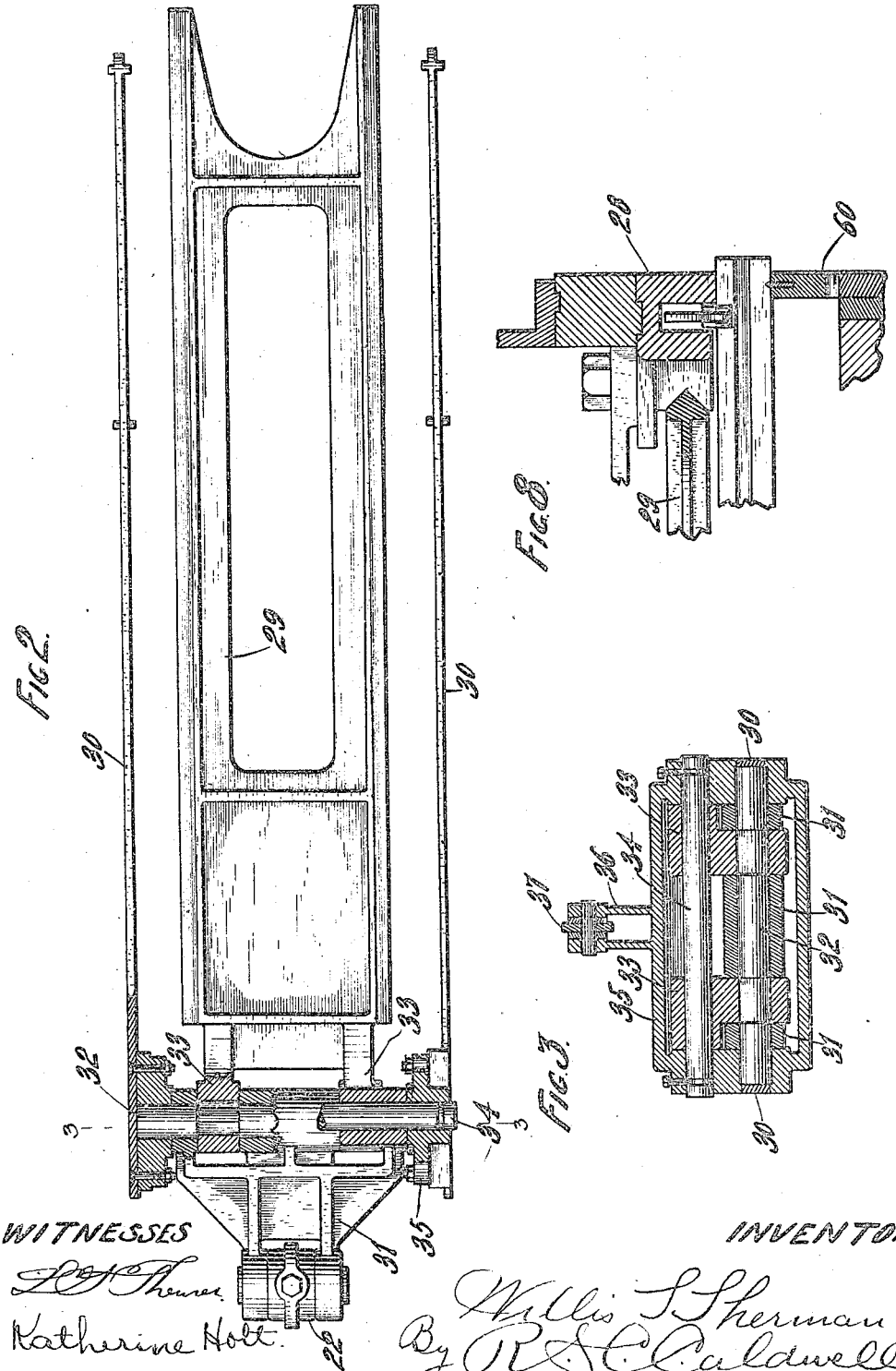

UNITED STATES PATENT OFFICE.

WILLIS S. SHERMAN, OF MILWAUKEE, WISCONSIN.

FEEDER FOR END-MATCHERS.

1,255,938.

Specification of Letters Patent. Patented Feb. 12, 1918.

Application filed June 3, 1916. Serial No. 101,508.

*To all whom it may concern:*

Be it known that I, WILLIS S. SHERMAN, a citizen of the United States, and resident of Milwaukee, in the county of Milwaukee and State of Wisconsin, have invented new and useful Improvements in Feeders for End-Matchers, of which the following is a description, reference being had to the accompanying drawings, which are a part of this specification.

This invention relates to end matchers and has for its object to provide a feeder for moving the work through the work feeding passageway by means of reciprocating hook members with actuating mechanism of novel construction.

With the above and other objects in view the invention consists in the feeder for end matchers as herein claimed and all equivalents.

Referring to the accompanying drawings, in which like characters of reference indicate the same parts in the different views, Figure 1 is a side view of an end matcher provided with the work feeding means constructed in accordance with this invention;

Fig. 2 is a plan view of the work feeding slide;

Fig. 3 is a sectional view thereof on the plane of line 3—3 of Fig. 2;

Fig. 4 is a side view thereof;

Fig. 5 is a sectional view of the operating means for the work feeding parts;

Fig. 6 is a vertical sectional view of the friction device of the operating means for the work feeding hook bars on the plane of line 6—6 of Fig. 5;

Fig. 7 is a horizontal sectional view thereof on the plane of line 7—7 of Fig. 5; and, Fig. 8 is a sectional detail view through a portion of the work feeding passageway.

In these drawings 20 indicates a main frame casing inclosing suitably operated driving mechanism for oscillating a swinging arm 22 which feeds work through the machine.

A knee portion 23 of the frame having adjustable guides under spring pressure constitutes a work supporting table between which and an overhanging head block 24 of the frame is formed a horizontal work feeding passageway through which work is mechanically fed past the cutters with each cycle of operation of the machine.

A vertical saw supporting frame 25 is connected at its edge to the rear face of the main frame, the points of attachment being at the base of the main frame below the knee and with the head block 24. Adjustably mounted on one side of the saw supporting frame 25 is a suitably driven arbor carrying a cut-off saw 26, while other suitably driven arbors adjustably mounted on the other side of the frame 25 carry tongue cutting saw blades 27, though the latter may be replaced by a single groove-cutting saw if desired.

The head block 24 is provided on its bottom surface with a pair of parallel horizontal grooved guide rails 28 which form the bearing surfaces for engaging the work, and therefore constitute the upper wall of the work feeding passageway. These guide rails 28 also form oppositely grooved guideways for a slide 29 which is reciprocated by the lever 22 and carries the work engaging hook members 30 receding within the deep grooves in the bottom of the guide rails.

The connection between the lever 22 and the slide 29 is such as to produce the lowering and the raising of the work feeding hook rods 30 during the feeding movement thereof and the return movement thereof respectively. A link 31 is pivotally connected to the upper end of the lever 22 and has three fork members carrying a rod 32 which loosely passes through a pair of bearing members 33 projecting from the rear end of the slide 30. The loose fit of the rod 32 in the bearing projections 33 is such as to allow of a certain degree of loose movement or play between the rod 32 and the slide. The bearing members 33 have upwardly extending projections through which a pivot rod 34 is passed to form the pivotal support for a rocking frame 35 the projecting ends of the pivot rod 34 fitting in the ends of the rocking frame for this purpose. The ends of the rod 32 also fit within the ends of the rocking frame 35 so that the relative movement between the link 31 and the slide 29, due to the play of the rod 32 in the bearing members 33 at the beginning of the movement of the lever 22 in either direction, causes the frame 35 to rock on the pivot rod 34. The work feeding hook rods 30 are let into grooves in the ends of the rocking frame so that the rocking movements of the frame cause swinging movements of the hook members to lower them into position for engagement with the work or to withdraw them within the grooves of the guide rail 28 at the beginning of the feeding stroke and the beginning of the return stroke respectively.

To insure against a throw of the work feeding hook members at the end of the movement of the slide in one direction, as by an overthrow thereof due to its momentum, and to insure the throw taking place at the beginning of the movement of the slide in either direction, a friction means is provided for the rocking frame tending to resist the movements thereof. For this purpose lugs 36 projecting upwardly from the top of the rocking frame 35 have a friction rod 37 pivotally connected between them and extending rearwardly between a pair of parallel stationary supporting rods 38 extending across the head block of the machine. A clamp member 39 has sleeve portions fitting on the rods 38 and secured thereto by means of set screws, and a plate 40 fitting in a vertical groove on one side thereof is held thereto with spring pressure by means of screw studs 41 projecting from said plate and passing through openings in the clamping member, with coil springs 42 surrounding the projecting ends of the studs and bearing at one end against nuts on the studs and at the other end against the clamping member 39. The flat friction rod 37 passes through a horizontal groove of the clamping member 39 between flanged friction members 43 of vulcanized fiber or other suitable material, one having its flanges embracing member 39 and the other having its flanges embracing the plate 40. The movements of the friction rod 37 between the friction members 43 will thus be resisted to a degree depending upon the pressure of the springs 42 which will be varied to suit the requirements by the adjustment of the nuts on the studs 41.

Spring actuated T-shaped presser bars 60 adjustably mounted on the knee form the lower bearing for the work, and consequently the wall of the work feeding passageway opposed to the guide rails 28 as best seen in Fig. 8.

In operation work is fed to the machine from the opposite side thereof to that shown in Fig. 1 and into the flaring entrance to the work feeding passageway where it engages a suitable trigger 61 to release a clutch, not shown, to start the driving mechanism in motion and thus cause the oscillation of the clutch lever 22. Each operation of the clutch produces one cycle of operation of the machine and the lever 22 starts from its forward position shown in Fig. 1. The rearward movement of the lever first causes the rod 32 to travel freely in the openings of the bearing members 33 of the work feeding slide to the extent of the play of such rod in the bearing members as shown in Fig. 5, thus causing the frame 35 to rock on the pivot rod 34 and lower the hook members 30 into the work feeding passageway to engage the strip of work which released the trigger, the further movement of the lever causing the slide 29 to move with it and thus draw the work through the work feeding passageway past the cutting edge of the saw 26. On the return or forward movement of the lever 22 the rod 32 is first moved to the other end of its play in the bearings 33 to again rock the frame 35 and lift the hook members 30 into the grooves of the guide rails 28, and then the slide 29 is pushed along its guides to its forward position where it is allowed to rest by the automatic disengagement of the clutch. In the following operation of the work feeding means the second set of hooks on the hook member 30 engage the strip of work where it was left by the first set of hooks and carries it past the matching cutters 27, dropping it off of the last presser bars 60 onto a belt conveyer 62 for conducting it away from the machine.

The friction rod 37 carried by the frame 35 assures the rocking movements of said frame at the beginning of each stroke of the work feeding slide and prevents an overthrow of the slide or movement thereof under its momentum beyond the point to which it is moved by the lever which might cause the hook members to project into the work feeding passageway while the machine is at rest and thus interfere with the introduction of the work.

If the parts work too freely it is only necessary to further tighten the nuts on the clamping bolts 41 of the friction clamp.

The hook members 30 by extending alongside of the work feeding slide 29 instead of projecting from the end thereof enable the entire machine to be made very much shorter, with the corresponding economy in the cost of manufacture.

As seen in Fig. 1 a lever 63 pivotally mounted on the head block 24 and actuated by a coil spring 64 has a pin and slot engagement with a sliding bar 65 which is in the path of the work as it is forced out of the work feeding passageway. This bar 65 is thus held forwardly with spring pressure but will yield to the movement of the work, and a spring pressed dog 66 engaging rack teeth on the bar serves to hold said bar in the position to which it is moved by the work so that while the bar in opposing the front edge of the work while the work is being moved by the work feeding hook members prevents the work from falling or tilting before it has been moved clear of the presser bars 60, it does not follow the return movement of the work feeding means but allows the work to fall onto the conveyer 62 only when it is entirely free from the work feeding passageway. The release of the dog 66 is accomplished by means of a rod 67 connecting it with a rotating part of the machine.

The slide 29 serves as a guide for the work engaging hook members and assures the work engaging hooks thereof alining with each other at right angles to the path of travel of the work so that the end of the work will be cut square.

What I claim as new and desire to secure by Letters Patent is:

1. A work feeding means for end matchers and the like, comprising a slide, a rocking frame pivotally mounted at one end of the slide, yielding means for resisting the travel of the rocking frame, work engaging hook bars carried by the rocking frame and extending along the slide, and an oscillating lever having a link connection with the rocking frame.

2. A work feeding means for end matchers and the like, comprising a slide, a rocking frame pivotally mounted on the slide, work engaging hook bars carried by the rocking frame and extending alongside of the slide, reciprocating means having a connection with the rocking frame, and means for yieldingly resisting the travel of the rocking frame.

3. A work feeding means for end matchers and the like, comprising a slide, a rocking frame pivotally mounted thereon, work engaging hook rods carried by the rocking frame, reciprocating means having connection with the rocking frame, a friction rod pivotally connected with the rocking frame, and a stationary friction clamp engaging the friction rod.

4. A work feeding means for end matchers and the like, comprising a slide, a rocking frame pivotally mounted thereon, work engaging hook rods carried by the rocking frame, a rod carried by the rocking frame and engaging the slide with a limited play to permit rocking movements of the rocking frame, and reciprocating means connected with the said rod.

5. A work feeding means for end matchers and the like, comprising a slide, a rocking frame pivotally mounted thereon, work engaging members carried by the rocking frame, a rod carried by the rocking frame and passing through openings in the slide with a limited play therein, and means for retarding the travel of the rocking frame.

6. A work feeding means for end matchers and the like, comprising a slide, a rocking frame pivotally mounted thereon, work engaging members carried by the rocking frame, a reciprocating means having connection with the rocking frame, a friction rod pivotally connected with the rocking frame, a stationary clamp member having a groove through which the friction rod passes, and a plate held to the clamp member with spring pressure and clamping the friction rod between it and the clamp member.

7. A work feeding means for end matchers and the like, comprising a slide, a rocking frame pivotally mounted thereon, work engaging members carried by the rocking frame, a reciprocating means having connection with the rocking frame, a friction rod pivotally connected with the rocking frame, a stationary clamp member having a groove through which the friction rod passes, a plate held to the clamp member with spring pressure, and friction members forming facings for the clamp member and the plate and bearing on opposite sides of the friction rod.

8. A work feeding means for end matchers and the like, comprising the combination with presser bars and guides forming a work feeding passageway, a slide traveling alongside of the work feeding passageway, a rocking frame pivotally mounted on the slide, means for yieldingly resisting the travel of the rocking frame, work engaging hook bars carried by the rocking frame and adapted to extend into the work feeding passageway, and reciprocating means having connection with the rocking frame.

9. A work feeding means for end matchers and the like, comprising a suitably guided rocking frame, work engaging hook bars carried by the rocking frame, reciprocating means having connection with the rocking frame for swinging the work engaging hook bars into and out of position for engaging the work and for reciprocating the work engaging hook bars for feeding the work through the machine.

In testimony whereof, I affix my signature, in presence of two witnesses.

WILLIS S. SHERMAN.

Witnesses:
KATHERINE HOLT,
R. S. C. CALDWELL.